Patented May 26, 1931

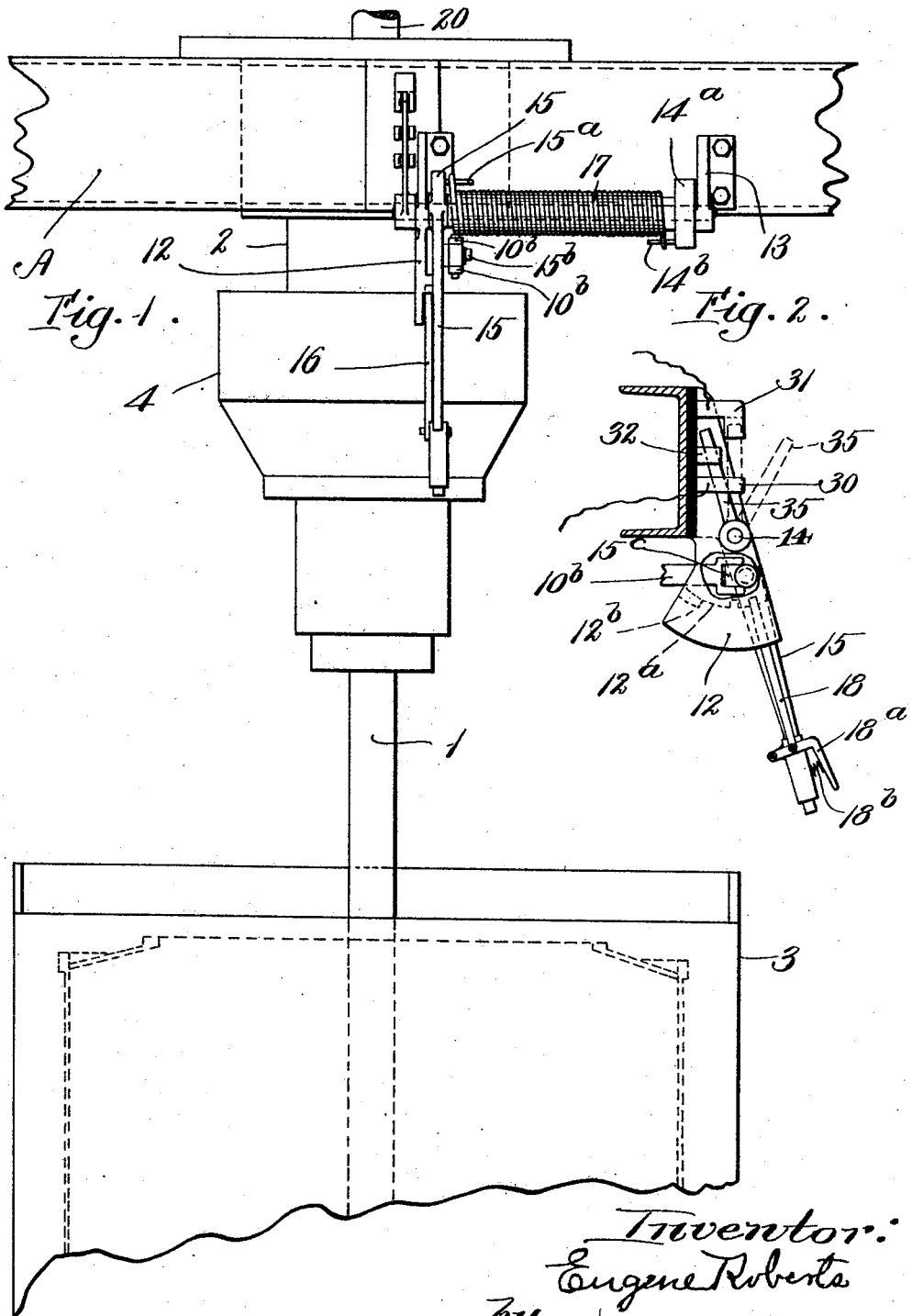

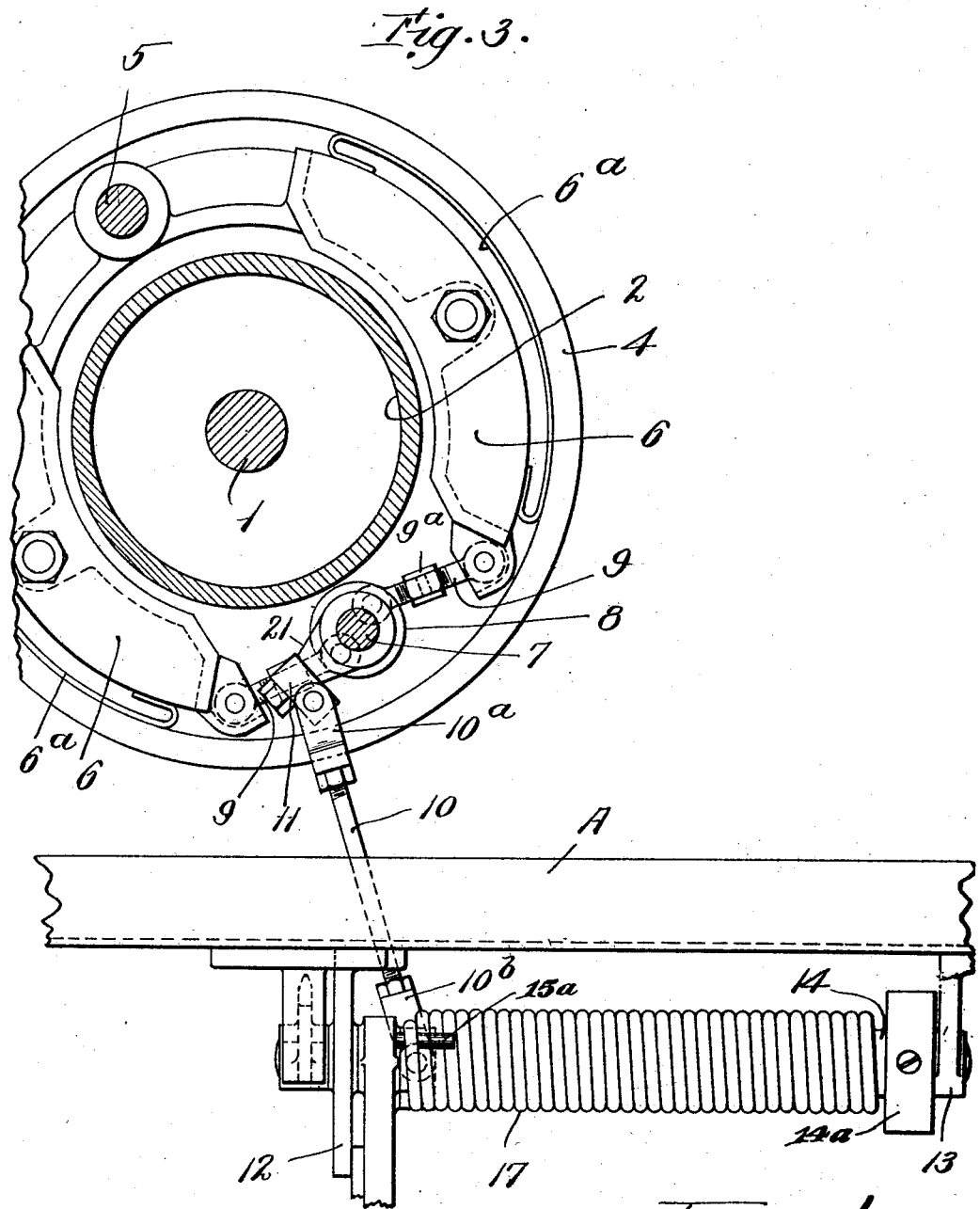

1,806,683

UNITED STATES PATENT OFFICE

EUGENE ROBERTS, OF NEW YORK, N. Y., ASSIGNOR TO THE WESTERN STATES MACHINE COMPANY, OF SALT LAKE CITY, UTAH, A CORPORATION OF UTAH

BRAKE MECHANISM FOR CENTRIFUGAL MACHINES

Application filed June 15, 1927. Serial No. 199,101.

This invention relates to brakes for centrifugal machines, and is intended to provide an improved brake having a construction that will adequately meet the peculiar requirements of centrifugal machine service.

Brakes for centrifugal machines, based upon the expanding toggle principle, such, for example, as is illustrated in United States Patent 1,599,373 granted to me September 7, 1926, are constructed to be set to active position to stop the centrifugal when the toggles are aligned on the dead center, a contractile spring being commonly used to keep the brake shoes against accidental contact with the surrounding brake pulley when the brake is released from active position by the flexing of the toggles. There are certain practical difficulties that have attended the use of this type of brake which it is the object of the present invention to overcome.

While it has been possible to adjust the toggle elements so as to incease the pressure of the brake shoes against the brake pulley, it will be evident, upon consideration, that this hard and fast setting of the brake involves variations in pressure as the brake shoes wear slightly so that it is not practicable to adjust the brake mechanism so as to effect a uniform and predetermined braking action upon the centrifugal. Uniformity of braking action is of great practical importance since, in the cycle of operations, when it is desirable that the retardation and stopping of the machine, through the brake, shall be effected in a known and definite period. Furthermore, with the hard and fast setting of the brake by turning the toggle links to dead center, by means of their actuating member, not only will there be considerable variations in, the amount of retardation exerted within a given period, but the brake itself is subjected to uneven wear.

In overcoming these difficulties my improvement consists, generally speaking, in the construction and arrangement by which the brake is actually set and maintained in active position by a brake-setting spring which is capable of adjustment to give any desired action, and which acts to set the brake shoes in active position against the brake pulley before the toggle links reach the dead center position of alignment, by which arrangement the spring of given predetermined tension is exerting and maintaining, at all times while in action, a uniform pressure of the brake shoes against the brake pulley so that the brake mechanism may be adjusted to effect a definitely timed retardation and stopping of the centrifugal while, owing to the elasticity of the braking pressure exerted, the life of the brake mechanism is greatly prolonged.

In the accompanying drawings I have illustrated a simple and convenient mechanism for applying this principle to a centrifugal brake mechanism, it being understood that the invention is applicable either to an automatically controlled centrifugal or to a hand controlled centrifugal.

In the accompanying drawings:

Figure 1 is a front elevation showing the usual type of overhead suspended gyratory centrifugal to which is applied my improved brake mechanism.

Figure 2 is a detail view in side elevation showing the starting lever and its connection with the brake mechanism.

Figure 3 is a plan view partly in section showing the self-setting brake with its operative connections.

The centrifugal illustrated and outlined in the drawings is of the usual suspended type embracing the well known vertical basket-carrying shaft or spindle 1, carrying the usual centrifugal basket shown in dotted lines inside the surrounding curb or casing 3, which shaft is suspended from an overhead hanger 2, carried by overhead I-beams A, according to the usual and well known practice. Connected to the basket shaft is the brake pulley 4, inside of which the expanding brake shoes are located, the expanding arcuate brake shoes 6 carrying the exterior friction pads 6a, adapted to engage the inside of the brake pulley, as shown in Figure 3.

As usual in this type of expanding brake, a vertical fulcral rod 5 depends from the hanger so as to project inside the brake pulley and forms a pivotal support for the two brake shoes 6.

On the opposite side of the center a rotatable vertical shaft 7, provided with an annular collar 8, is also supported from the hanger.

Links 9, adjustable as to length by turn buckles 9a, form an operative connection between the brake-actuating shaft collar 8 and the free ends of the brake-shoes 6, said links being pivotally connected at both ends to the respective members so that by the rotation of the brake-actuating spindle 7 the toggle arms 9 may be extended to force the brake shoes into firm contact with the interior of the brake pulley, or by reverse rotation may be positively withdrawn from such contact. In this case (Fig. 3) a clockwise rotation of the brake spindle 7 expands the brake into active position, while a counter-clockwise rotation pulls the brake shoes out of contact.

The actuating means, in the form of the invention shown, comprises, a rock-shaft 14, around which is placed a powerful helical spring 17, the right hand end of which is anchored to a projecting pin 14b on an adjustable collar 14a carried by bracket 13, while the opposite end of this helical spring is looped around a projecting pin 15a carried by the upper end of a starting lever 15, which lever is secured firmly to the rock-shaft 14. The arrangement is such that the tension of the brake setting spring 17 is exerted to throw the lower end of the lever 15 rearwardly in order to set or expand the brake with the desired degree of tension.

Any suitable connecting means between the brake-actuated spring and the brake arm may be employed, and in this case I have shown a connecting link 10 carrying, at its rear and forward ends, respectively, adjustably connected forks or clevises 10a and 10b. The rear clevis 10a has pivotal connection with a swivel block 11, carried by the outer end of an arm 21, securely fastened to the vertical brake-setting spindle 7. The forward clevis or connecting member 10b, in similar fashion, has a pivotal connection with a swivel block 15c carried by the starting lever 15, at a point somewhat below the axis of the lever.

In the present case the lever 15 accomplishes two purposes. By its forward movement it establishes driving connection for operating the centrifugal machine, while at the same time releasing the brake shoes from braking contact with the brake pulley.

To retain it in its forward position against the counteraction of the brake-setting spring 17, I provide a stop pin or member 18 actuated by a pivotal hand-grip 18a which, by means of a spring 18b, is normally maintained in locking position so that the upper end of the pin or rod 18 will engage the forward notch in a notched sector 12a, there being in this case an intermediate notch for allowing the lever to stand in an intermediate position for the purpose of establishing a low speed connection for the centrifugal, while still keeping the brake out of engagement with the brake pulley, as will now be explained.

The machine shown in the drawings, as indicated in Figure 1, is intended to be driven by an overhead motor-shaft 20, by well known form of connections which need not here be shown.

The electric circuit for driving the motor in the present case is intended to be a double circuit for giving different speeds to the motor. In this case, the terminal 30 is common to both circuits, while the terminal 31 is the low speed terminal and the terminal 32 is the high speed terminal. The former circuit is closed when the lever 15 is in the intermediate position, and the latter is closed when the lever 15 is in its forward position. At the rear of the sector there is a shoulder 12b which acts as a stop to limit the rearward movement of the lever in case the brake connection is temporarily disconnected for any purpose.

A movable switch arm 35 is secured to the left hand end of the rock-shaft 14 so disposed thereon that when the lever 15 is in its forward position this knife switch-arm will establish contact between terminals 30 and 32, but in its intermediate position such connection will be established between terminal 30 and 31 which is the low speed circuit.

What I claim is:

1. A brake mechanism for a gyratory suspended centrifugal machine spindle, embracing in combination with a brake pulley fast on the gyratory spindle, of interiorly disposed pivotal brake shoe members, brake expanding toggle members, a rotatable expanding member also located inside said brake pulley and having connection with the brake shoe members through said toggles, releasable self-acting means for rotating said toggle-expanding member to extend the toggles to brake-setting position before the toggles reach a position of dead centre, said actuating means being provided with adjustment to produce and maintain the desired amount of pressure of the brake shoes against the pulley.

2. A brake mechanism for a gyratory suspended centrifugal machine spindle, embracing in combination with a brake pulley fast on the gyratory spindle, brake shoe members pivotally supported inside said pulley, an expanding toggle device rotatable wholly in a horizontal plane to expand the brake members into braking engagement with the pulley while the toggles are still off the dead centre position, a helical torsion spring normally acting when operative to actuate the toggle to brake setting position and to maintain it in such position whereby a constant predetermined braking pressure is maintained against the inside of the pulley.

3. A brake mechanism for a gyratory suspended centrifugal machine spindle, embracing in combination a brake actuating torsion spring, a brake setting and releasing lever connected with said spring and normally actuated thereby to be moved to and maintained in brake setting position, releasable means for retaining said lever out of brake setting position, pivotal brake members operatively associated with a brake pulley fast on the gyratory spindle, said brake members being interconnected with said lever to cause them to be moved to and maintained in braking positon under constant pressure from said spring during the braking period.

4. A brake mechanism for a gyratory suspended centrifugal machine spindle, embracing in combination a brake-actuating torsion spring, a brake-setting and releasing lever connected with said spring and normally actuated thereby to be moved to and maintained in brake-setting position, releasable means for retaining the said lever out of brake-setting position, pivotal brake members operatively associated with a brake pulley fast on the gyratory spindle, said brake members being interconnected with said lever to cause them to be moved to and maintained in braking position at a predetermined pressure from said spring, and means for varying the torsional tension of said spring in order to obtain different degrees of braking action against the pulley.

5. A brake mechanism for a gyratory suspended centrifugal machine spindle, embracing in combination a brake pulley fast on the gyratory spindle around its centre of suspension, interiorly disposed pivotal brake shoe members, brake-expanding toggle members, a starting and stopping lever for controlling the centrifugal having connection with said toggle members, a lever-actuating spring, adjustable as to tension, having connection with said lever to move it to and maintain it in brake setting position under constant predetermined pressure, and a releasable detent by which said lever may be maintained out of brake-setting position against the tension of said spring.

6. The combination with a gyratory centrifugal machine spindle having two speed driving means, of a brake pulley fast on the spindle, toggle actuated brake shoe members operatively associated with said brake pulley, a starting and stopping lever interconnected with the brake-actuating toggles, an actuating spring normally operating through the lever and toggles to keep the brake shoes in braking engagement with the brake pulley, and means for releasably locking the lever away from braking position in either of two different positions, whereby predetermined braking pressure is maintained while permitting either speed drive to be utilized when the brake is released.

7. In a brake mechanism for a two-speed drive gyratory centrifugal spindle, the combination with a brake pulley fast on the spindle near its center of gyration, of pivotal brake shoe members mounted inside the pulley, means for expanding the brake shoe against the inside of the pulley, a spring actuated control lever operatively associated with the spindle driving means and with said brake and normally moved to braking position by said spring, said lever being movable away from braking position to different operative drive positions, and means for releasably locking said lever in either of two drive positions against the tension of said spring, whereby the brake is automatically set by the spring when the lever is released from either driving position.

8. The combination with a suspended centrifugal and its driving means, of a brake mechanism embracing a brake pulley secured to the shaft of the centrifugal, brake elements movable into brake engagement with said pulley, a brake-actuating rock shaft connected with the brake elements and normally retained in non-braking position while the centrifugal is running, a torsion spring connected with the rock shaft to rotate it to brake-setting position, a manually operable lever cooperatively related to the centrifugal driving means and having connection with said brake-actuating rock shaft to cause the unsetting of the brake before the driving means is energized by the movement of said lever.

9. A brake mechanism for a suspended centrifugal having an overhead drive, embracing a brake pulley secured to, and rotating with, the suspension shaft of he centrifugal, toggle operated braking means movable into braking engagement with said pulley while the toggles are still partly flexed, means for exerting a continuous predetermined but variable pressure of the braking means against the pulley through said partly flexed toggles, and manually operable means for causing the unsetting of the brake and the application of the driving power to the centrifugal.

10. A brake mechanism for a suspended centrifugal having an overhead drive, embracing a brake pulley fast on, and rotating with, the suspension shaft of the centrifugal, non-rotary coacting braking means movable into braking engagement with said pulley, means interconnected with said braking means for exerting the continuous application of predetermined but variable pressure of the braking means against the pulley to cause the stopping of the centrifugal in the desired predetermined period of time, and manually operable means for effecting the unsetting of the brake and the starting of the centrifugal.

In witness whereof, I have subscribed the above specification.

EUGENE ROBERTS.